US012610119B2

(12) United States Patent
Xu et al.

(10) Patent No.: US 12,610,119 B2
(45) Date of Patent: Apr. 21, 2026

(54) CAMERA DEVICE COMPRISING ANTI-SHAKE MODULE AND FOCUSING MODULE

(71) Applicant: Changzhou AAC Raytech Optronics Co., Ltd., Changzhou City (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 43 days.

(21) Appl. No.: 18/742,901

(22) Filed: Jun. 13, 2024

(65) Prior Publication Data

US 2025/0267347 A1    Aug. 21, 2025

Related U.S. Application Data

(63) Continuation of application No. PCT/CN2024/091430, filed on May 7, 2024.

(30) Foreign Application Priority Data

Feb. 20, 2024    (CN) .......................... 202410191585.3
Apr. 26, 2024    (CN) .......................... 202410516839.4

(51) Int. Cl.
*H04N 23/54* (2023.01)
*G02B 7/09* (2021.01)
(Continued)

(52) U.S. Cl.
CPC ............. *H04N 23/54* (2023.01); *H04N 23/51* (2023.01); *H04N 23/55* (2023.01); *H04N 23/57* (2023.01);
(Continued)

(58) Field of Classification Search
CPC .... H04N 23/68; H04N 23/682; H04N 23/685; H04N 23/687; H04N 23/67; H04N 23/50; H04N 23/51; H04N 23/54; H04N 23/55; H04N 23/57; G02B 7/09; G03B 2205/0007; G03B 2205/0038; G03B 2205/0053; G03B 2205/0069
See application file for complete search history.

(56) References Cited

U.S. PATENT DOCUMENTS

2024/0048830 A1*    2/2024    Bian .................... G02B 27/646

* cited by examiner

*Primary Examiner* — Twyler L Haskins
*Assistant Examiner* — Akshay Trehan
(74) *Attorney, Agent, or Firm* — Wiersch Law Group

(57) ABSTRACT

The present application provides a camera device and an electronic device, and the camera device includes a lens module; a focusing drive module including a first casing, a lens barrel, a focusing drive assembly configured to drive the lens barrel to move, and a focusing guide assembly configured to guide the lens barrel to move along a direction of an optical axis of the lens module; and an anti-shake drive module including a second casing, a bracket, an image sensor, an anti-shake drive assembly configured to drive the bracket to move, and an anti-shake guide assembly configured to guide the bracket to move in a direction perpendicular to the optical axis. The lens module, the focusing drive module, and the anti-shake drive module are fixed into one unit. The camera device can effectively ensure the camera quality, is easier to assemble, and can effectively improve the product yield rate.

11 Claims, 15 Drawing Sheets

10

(51) Int. Cl.

| | |
|---|---|
| *H04N 23/51* | (2023.01) |
| *H04N 23/55* | (2023.01) |
| *H04N 23/57* | (2023.01) |
| *H04N 23/68* | (2023.01) |

(52) U.S. Cl.
CPC ............. *H04N 23/687* (2023.01); *G02B 7/09* (2013.01); *G03B 2205/0069* (2013.01)

10

10

10

10

10

CAMERA DEVICE COMPRISING ANTI-SHAKE MODULE AND FOCUSING MODULE

CROSS-REFERENCE TO RELATED APPLICATIONS

This application is a continuation of International Application No. PCT/CN2024/091430, filed on May 7, 2024, which claims priority to Chinese patent application No. 202410191585.3, filed on Feb. 20, 2024, and Chinese patent application No. 202410516839.4, filed on Apr. 26, 2024. The entire contents of these applications are incorporated herein by reference in their entirety.

TECHNICAL FIELD

The present application relates to the field of camera devices, in particular to a camera device and an electronic device.

BACKGROUND

In the related art, common handheld optical products such as digital cameras, camcorders, and smartphones utilize optical systems composed of optical lens modules combined with imaging drive modules. Besides featuring autofocus functionality, the imaging drive module also incorporates image stabilization due to the susceptibility of handheld optical products to external forces during focusing or photography, such as shaking caused by handheld operation, vehicle movement, or environmental factors, leading to image blurring or lack of clarity. Consequently, the imaging drive module often includes image stabilization features. Given its integration of multiple functions, the structure of the imaging drive module is complex, including numerous components assembled together. As a result, the assembly process of the imaging drive module is intricate, and any slight oversight can easily result in improper assembly of handheld optical products, thereby affecting product yield.

Therefore, it is necessary to provide a camera device and an electronic device that offer clear imaging, easy assembly, and high product yield.

SUMMARY

An object of the present application is to provide a camera device and an electronic device to solve the technical problems of unclear imaging, difficult assembly and low product yield of the camera device in the related art.

The technical solution of the present application is as follows.

In a first aspect, the present application provides a camera device comprising:
- a lens module;
- a focusing drive module comprising:
  - a first casing;
  - a lens barrel accommodated in the first casing and fixed with the lens module;
  - a focusing drive assembly; the focusing drive assembly being connected to the first casing and the lens barrel for driving the lens barrel to move with respect to the first casing, and comprising a focusing magnetic steel and a focusing coil that are arranged correspondingly, wherein the focusing magnetic steel is fixed to the first casing, and the focusing coil is fixed to the lens barrel; and

- a focusing guide assembly confined between the first casing and the lens barrel for guiding the lens barrel in a direction of an optical axis of the lens module; and
- an anti-shake drive module comprising:
  - a second casing;
  - a bracket accommodated in the second casing and fixed with the image sensor;
  - an image sensor;
  - an anti-shake drive assembly connected to the second casing and the bracket for driving the bracket to move with respect to the second casing; and
  - an anti-shake guide assembly confined between the second casing and the bracket for guiding the bracket in a direction perpendicular to the optical axis of the lens module;
  - wherein the lens module, the focusing drive module, and the anti-shake drive module are sequentially fixed into one unit.

In one embodiment, the anti-shake drive module comprises a planar first circuit board partially accommodated in the second casing; the first circuit board is fixed to a side of the bracket away from the lens module, and a first mounting hole is provided in a middle of the first circuit board; the image sensor is fixed in the first mounting hole, and the image sensor and the anti-shake drive assembly are electrically connected to the first circuit board.

In one embodiment, the first circuit board comprises a first circuit board body provided with the first mounting hole, a circuit board fixing portion elastically connected to an outside of the first circuit board body, and a first electrical connection portion fixed to the circuit board fixing portion; the first circuit board body and the circuit board fixing portion are accommodated in the second casing, and the first circuit board body is fixed to the bracket; the circuit board fixing portion is fixed to the second casing, and the first electrical connection portion is extended out of the second casing; the first circuit board further comprises a plurality of avoiding spaces that are symmetrically arranged, wherein the avoiding spaces are formed between the first circuit board body and the circuit board fixing portion; a side of the bracket facing the first circuit board is provided with anti-collision tabs arranged one-to-one with the avoiding spaces; each of the anti-collision tabs is arranged through one of the avoiding spaces correspondingly, and the bracket further comprises an anti-collision surface parallel to the direction of the optical axis.

In one embodiment, there are a plurality of the anti-shake guide assemblies, and each of the anti-shake guide assemblies is confined between the second casing and the bracket, and comprises a first ball and two support pieces; wherein the two support pieces are abutted against opposite ends of the first ball along the direction of the optical axis, respectively; one of the support pieces is also abutted against the second casing, and the other of the support pieces is also abutted against the bracket.

In one embodiment, there are a plurality of the anti-shake drive assemblies, and each of the anti-shake drive assemblies is connected to the second casing and bracket, and comprises an anti-shake magnetic steel and an anti-shake coil that are arranged correspondingly; wherein the anti-shake magnetic steel is fixed to the second casing, and the anti-shake coil is fixed to the bracket and electrically connected to the first circuit board; the anti-shake drive module further comprises anti-shake magnetic yokes arranged in correspondence with the anti-shake drive assemblies, wherein the anti-shake magnetic yokes are fixed to the bracket.

In one embodiment, the anti-shake drive module further comprises a second circuit board; the second circuit board is fixed between the anti-shake coil and the bracket, and the anti-shake coil is electrically connected to the first circuit board through the second circuit board.

In one embodiment, there are a plurality of the focusing guide assemblies; each of the focusing guide assemblies is confined between the first casing and the lens barrel, and comprises a plurality of second balls arranged sequentially along the direction of the optical axis.

In one embodiment, there are three second balls, and a diameter of the second ball located in the middle is smaller than diameters of two second balls located on both sides.

In one embodiment, there are a plurality of the focusing drive assemblies; each of the focusing drive assemblies is connected to the first casing and lens barrel respectively; the focusing drive module further comprises a focusing magnetic yoke arranged in correspondence with the focusing drive assemblies, wherein the focusing magnetic yoke is fixed to the lens barrel.

In one embodiment, the first casing comprises a first shell and a base inserted within the first shell, and the focusing drive module further comprises an elastic member and a third circuit board; the elastic member is connected to the base and lens barrel; a conductive insert is embedded in the base, and the focusing coil is electrically connected to the third circuit board through the elastic member and the conductive insert in turn.

In one embodiment, the second casing comprises a second shell and a base covered on a side of the second shell away from the focusing drive module; a convex portion is formed by extending outwardly from an edge of the base, and an edge of the second shell is formed with a concave portion for accommodating the convex portion; the convex portion and the concave portion are fixed together by laser welding, and a gap between the second shell and the base is glued and sealed.

In one embodiment, the second casing is provided with a second mounting hole for cooperating with the lens module, and a lower end of the first casing is formed with a limiting tab inserted in the second mounting hole.

In one embodiment, the anti-shake guide assembly is further configured to guide the bracket to rotate on an axis of the optical axis in a plane perpendicular to the optical axis.

In a second aspect, the present application provides an electronic device comprising a device body and any one of the above-mentioned camera devices, wherein the camera device is provided on the device body.

The beneficial effect of the present application is that the camera device and the electronic device of the present application are provided with a focusing guide assembly for guiding the lens barrel to move along a direction of an optical axis of the lens module, and an anti-shake guiding assembly for guiding the bracket to move along a direction perpendicular to the direction of the optical axis of the lens module, so as to effectively limit the movement direction of the lens barrel and the image sensor, thereby realizing anti-shake and effectively ensuring the camera quality. Furthermore, the lens module, the focusing drive module, and the anti-shake drive module are three independent modules. When assembling, each module is assembled separately, and then the three modules are assembled together, which reduces the difficulty of assembling and is easier to assemble, thereby effectively improving the product yield rate.

DETAILED DESCRIPTION OF THE EMBODIMENTS

Figure 1:
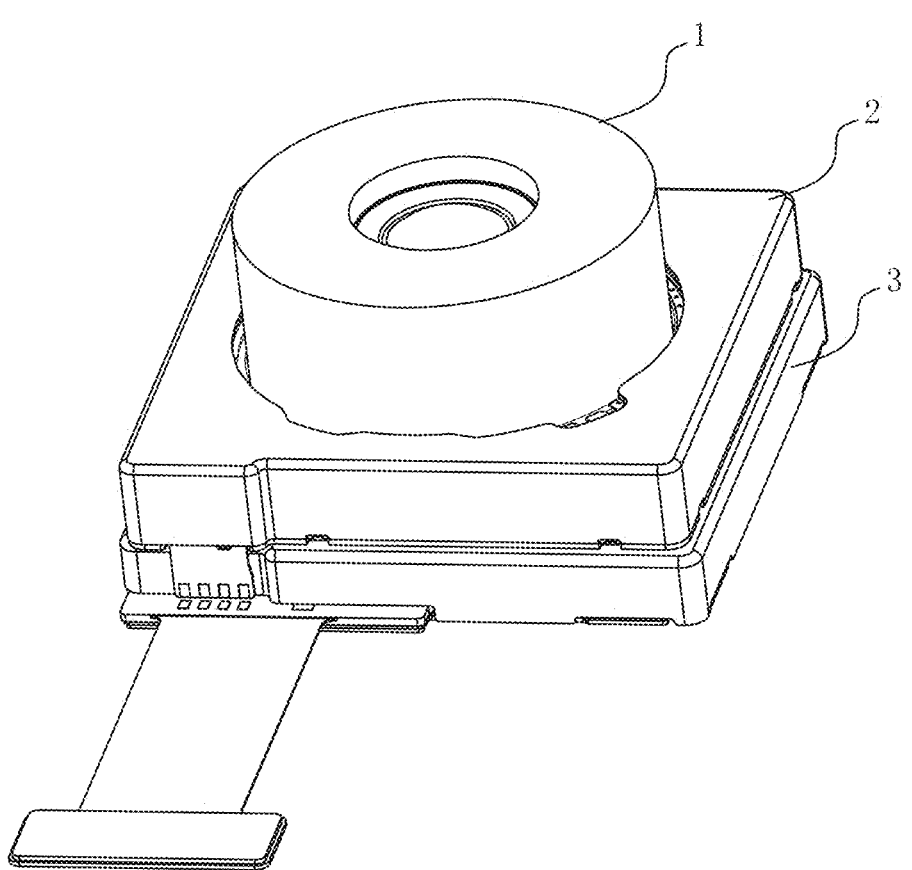
FIG. 1 shows a structural schematic diagram of a camera device of the present application.
Figure 2:
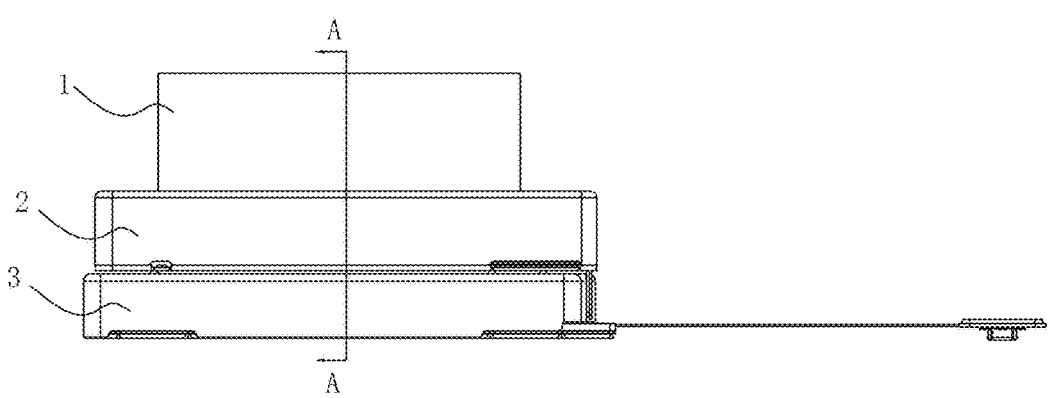
FIG. 2 shows a structural schematic diagram of the camera device shown in FIG. 1.

The present application is further described below in conjunction with the accompanying drawings and embodiments.

An embodiment of the present application provides a camera device 10, including a lens module 1, a focusing drive module 2, and an anti-shake drive module 3. The lens module 1, the focusing drive module 2, and the anti-shake drive module 3 are arranged sequentially along a direction of an optical axis and are fixed into a single unit in sequence, as shown in FIGS. 1 to 5. The focusing drive module 2 includes a first casing 201, a lens barrel 202, a focusing drive assembly 203, and a focusing guide assembly 204. The lens barrel 202 is accommodated in the first casing 201, and the lens barrel 202 is fixed with the lens module 1. The focusing drive assembly 203 is connected to the first casing 201 and the lens barrel 202, and the focusing drive assembly 203 is configured to drive the lens barrel 202 to move relative to the first casing 201. The focusing drive assembly 203 includes a focusing magnetic steel 2031 and a focusing coil 2032 that are arranged correspondingly. The focusing magnetic steel 2031 is fixed to the first casing 201, and the focusing coil 2032 is fixed to the lens barrel 202. A focusing guide assembly 204 is confined between the first casing 201 and the lens barrel 202, and the focusing guide assembly 204 is configured to guide the lens barrel 202 to move in the direction of the optical axis of the lens module 1. The anti-shake drive module 3 includes a second casing 301, a bracket 302, an image sensor 303, an anti-shake drive assembly 304, and an anti-shake guide assembly 305. The bracket 302 is accommodated in the second casing 301, and the bracket 302 is fixed with the image sensor 303. The anti-shake drive assembly 304 is connected to the second casing 301 and the bracket 302, and the anti-shake drive assembly 304 is configured to drive the bracket 302 to move relative to the second casing 301. The anti-shake guide assembly 305 is confined between the second casing 301 and the bracket 302, and the anti-shake guide assembly 305 is configured to guide the bracket 302 to move in a direction perpendicular to the optical axis of the lens module 1.

Figure 6:
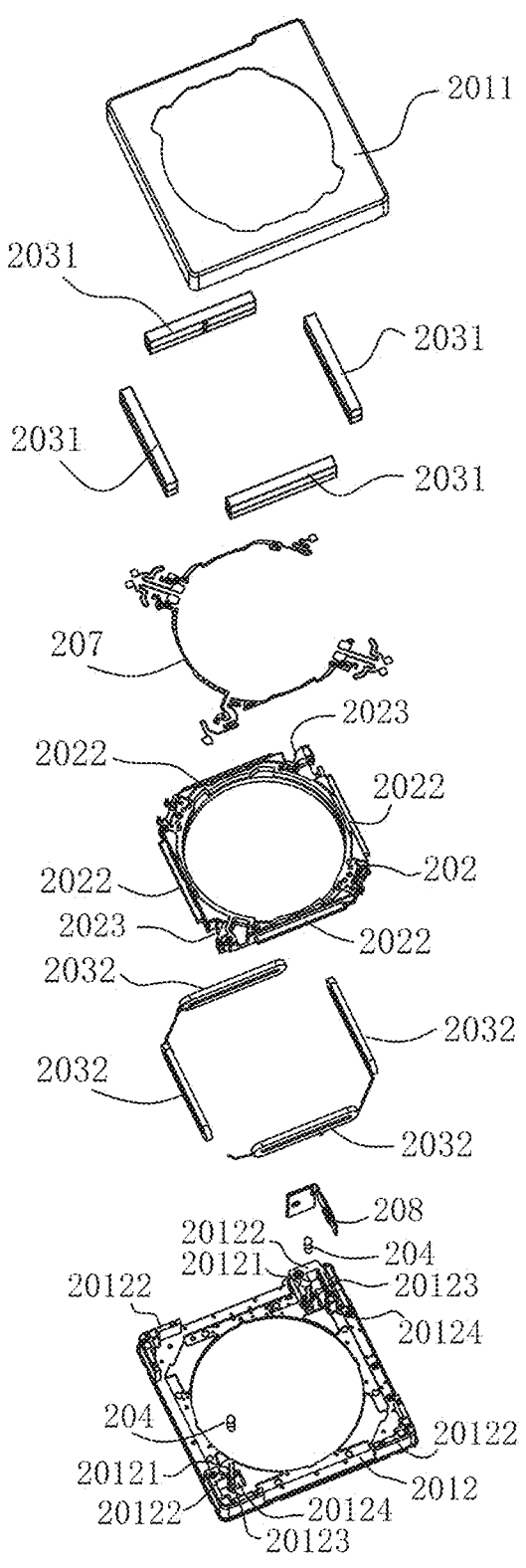
FIG. 6 shows an exploded view of a focusing drive module in the camera device shown in FIG. 1.
Figure 12:
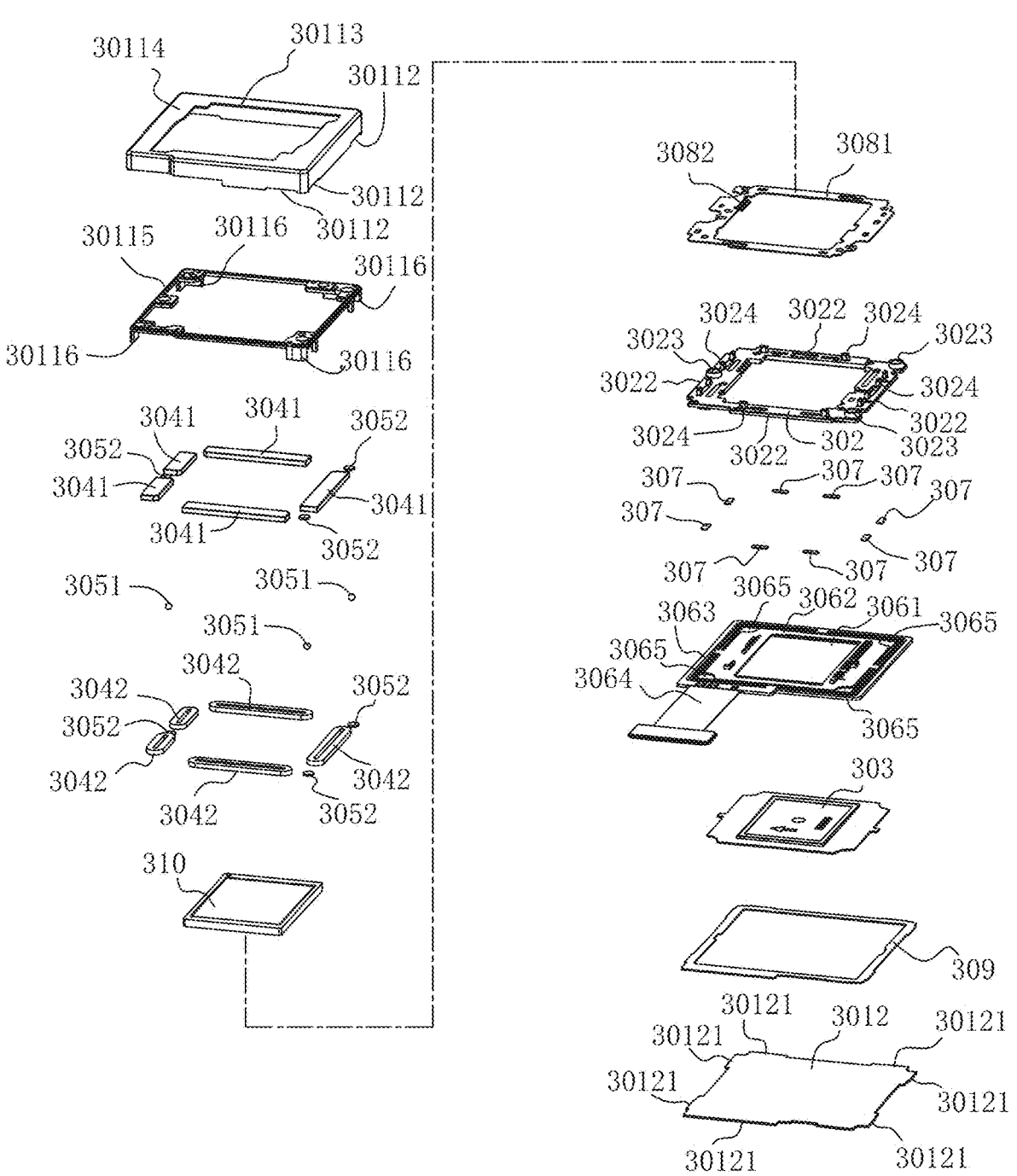
FIG. 12 is an exploded view of an anti-shake drive module in the camera device shown in FIG. 1.

In the embodiment of the present application, as shown in FIGS. 6 and 12, the camera device 10 is provided with a focusing guide assembly 204 configured to guide the lens barrel 202 to move in the direction of the optical axis of the lens module 1, and the anti-shake guide assembly 305 is configured to guide the bracket 302 to move in the direction perpendicular to the optical axis of the lens module 1, so as to effectively limit the movement direction of the lens barrel 202 and the image sensor 303, thereby realizing anti-shake and effectively ensuring the camera quality. Furthermore, the lens module 1, the focusing drive module 2, and the anti-shake drive module 3 are three independent modules. When assembling, each module is assembled separately, and then the three modules are assembled together, which reduces the difficulty of assembling and makes it easier to assemble, thereby effectively improving the product yield rate.

In this embodiment, the focusing guide assembly 204 for guiding the lens barrel 202 to move in the direction of the optical axis of the lens module 1 may be that the focusing guide assembly 204 guides the lens barrel 202 to move in the direction of the optical axis of the lens module 1.

Figure 13:
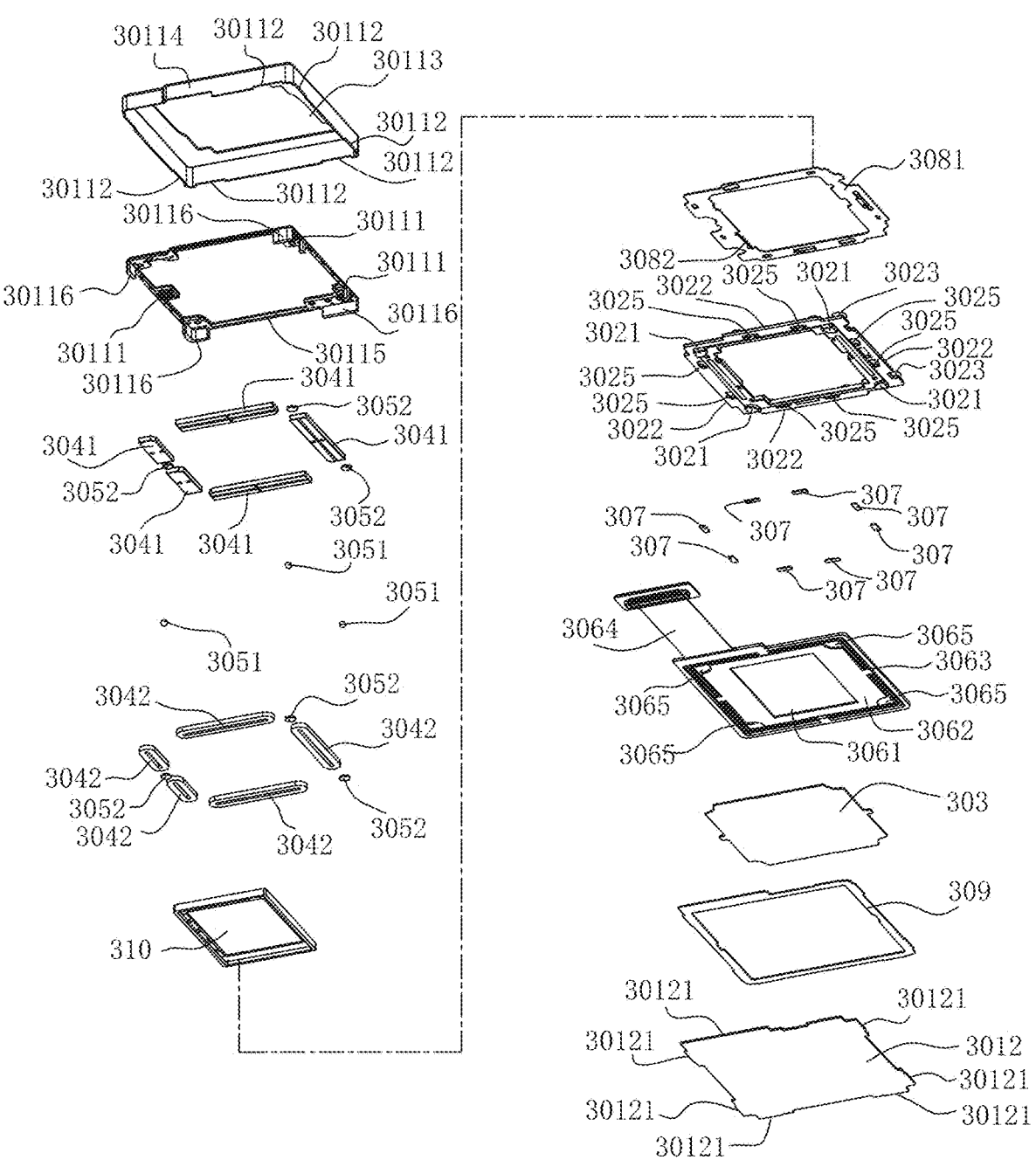
FIG. 13 shows an exploded view of the anti-shake drive module in the camera device shown in FIG. 1.

In this embodiment, the anti-shake guide assembly 305 for guiding the bracket 302 to move in the direction perpendicular to the optical axis of the lens module 1 may be that the anti-shake guide assembly 305 guides the bracket 302 to move in the direction perpendicular to the optical axis of the lens module 1. Additionally, the anti-shake guide assembly 305 may also be configured to guide the bracket 302 to rotate on an axis of the optical axis in a plane perpendicular to the optical axis. In some embodiments, the anti-shake drive module 3 further includes a first circuit board 306. As shown in FIGS. 12 and 13, the first circuit board 306 is in a planar shape, which can effectively reduce the thickness of the anti-shake drive module 3 as well as the camera device 10, and thus effectively reduce the size of the camera device 10. Moreover, the first circuit board 306 is partially accommodated in the second casing 301, the first circuit board 306 is fixed to a side of the bracket 302 away from the lens module 1, and a first mounting hole 3061 is opened in the middle of the first circuit board 306. The image sensor 303 is fixed in the first mounting hole 3061, and the image sensor 303 and the anti-shake drive assembly 304 are electrically connected to the first circuit board 306.

In some embodiments, the first circuit board 306 may be a Flexible Printed Circuit (FPC), which is easier to assemble.

In some embodiments, as shown in FIGS. 12 and 13, the first circuit board 306 includes a first circuit board body 3062, a circuit board fixing portion 3063, and a first electrical connection portion 3064. The first mounting hole 3061 is provided in the first circuit board body 3062. The circuit board fixing portion 3063 is elastically connected to the outside of the first circuit board body 3062. The first electrical connection portion 3064 is fixed to the circuit board fixing portion 3063. The first circuit board body 3062 and the circuit board fixing portion 3063 are accommodated in the second casing 301, and the first circuit board body 3062 is fixed to the bracket 302. The circuit board fixing portion 3063 is fixed to the second casing 301, and the first electrical connection portion 3064 is extended out of the second casing 301.

In some embodiments, the first circuit board 306 further includes a frame-shaped elastic connection portion 3066. The elastic connection portion 3066 is elastically connected to the first circuit board body 3062 and the circuit board fixing portion 3063, such that the first circuit board body 3062 can be moved in a plane perpendicular to the direction of the optical axis, thereby driving the image sensor 303 to move.

Figure 16:
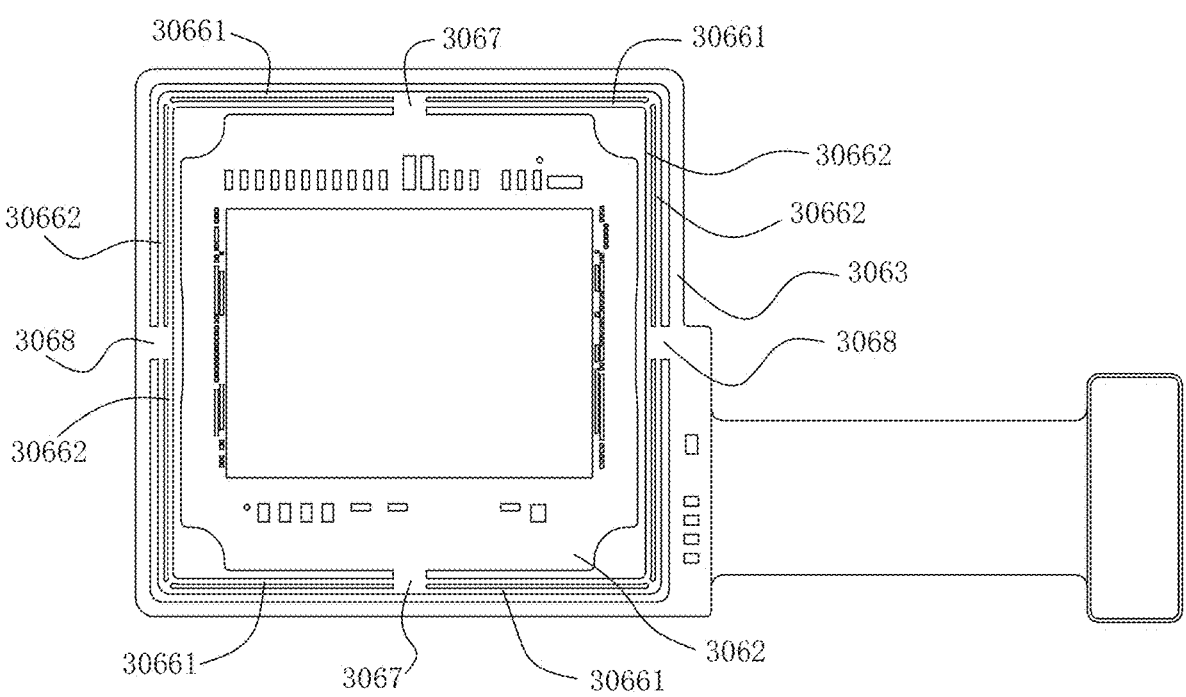
FIG. 16 shows a structural schematic diagram of a first circuit board in the camera device shown in FIG. 1.
Figure 17:
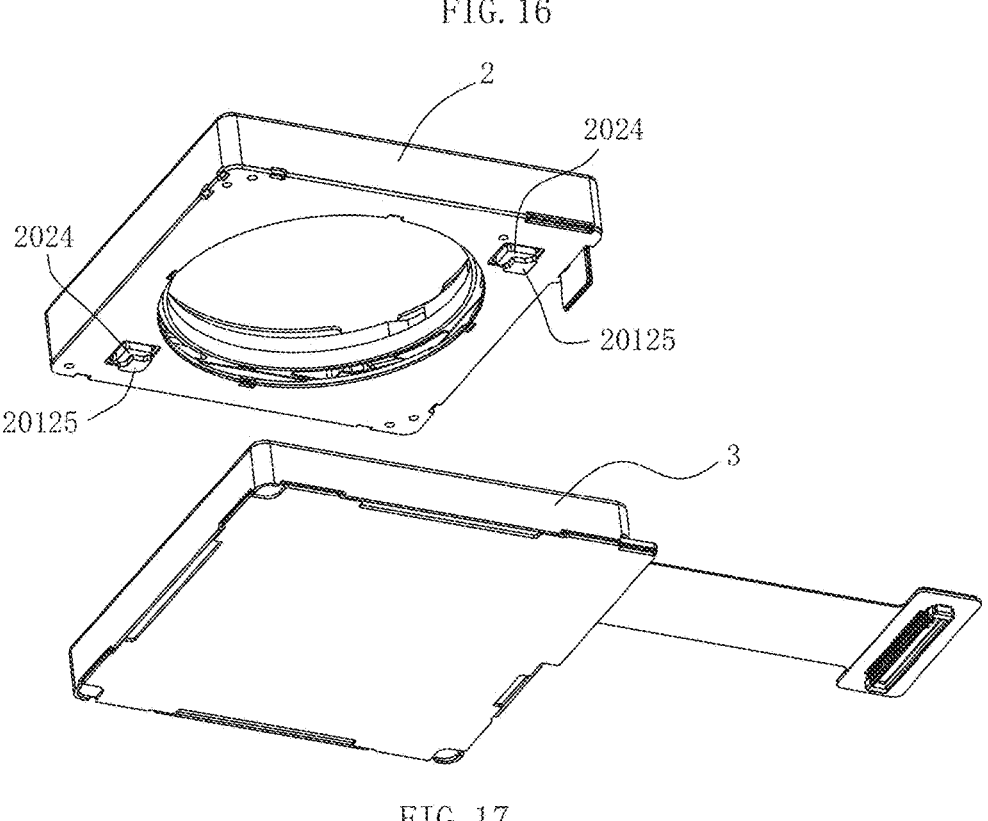
FIG. 17 shows an exploded view of the camera device of the present application with the lens module removed.
Figure 18:
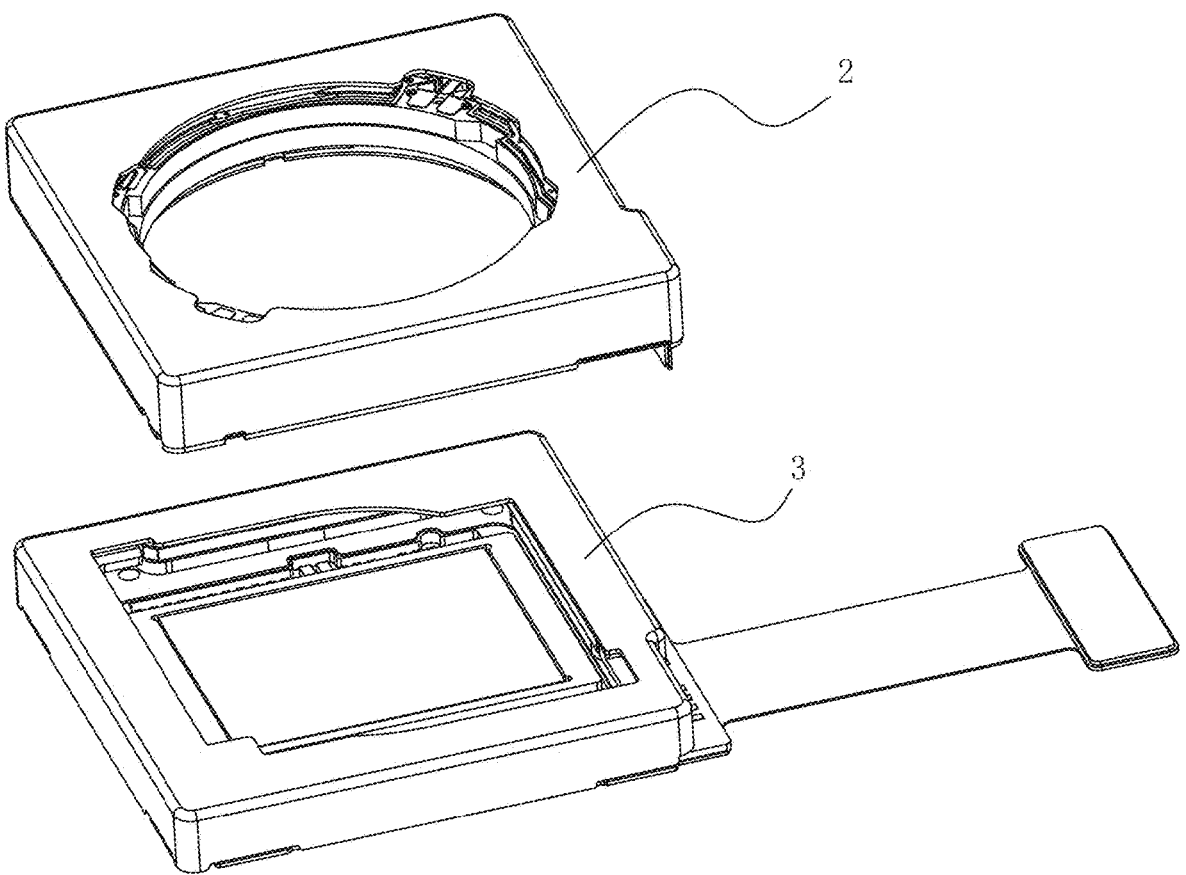
FIG. 18 shows an exploded view of the camera device shown in FIG. 17 with the lens module removed.
Figure 19:
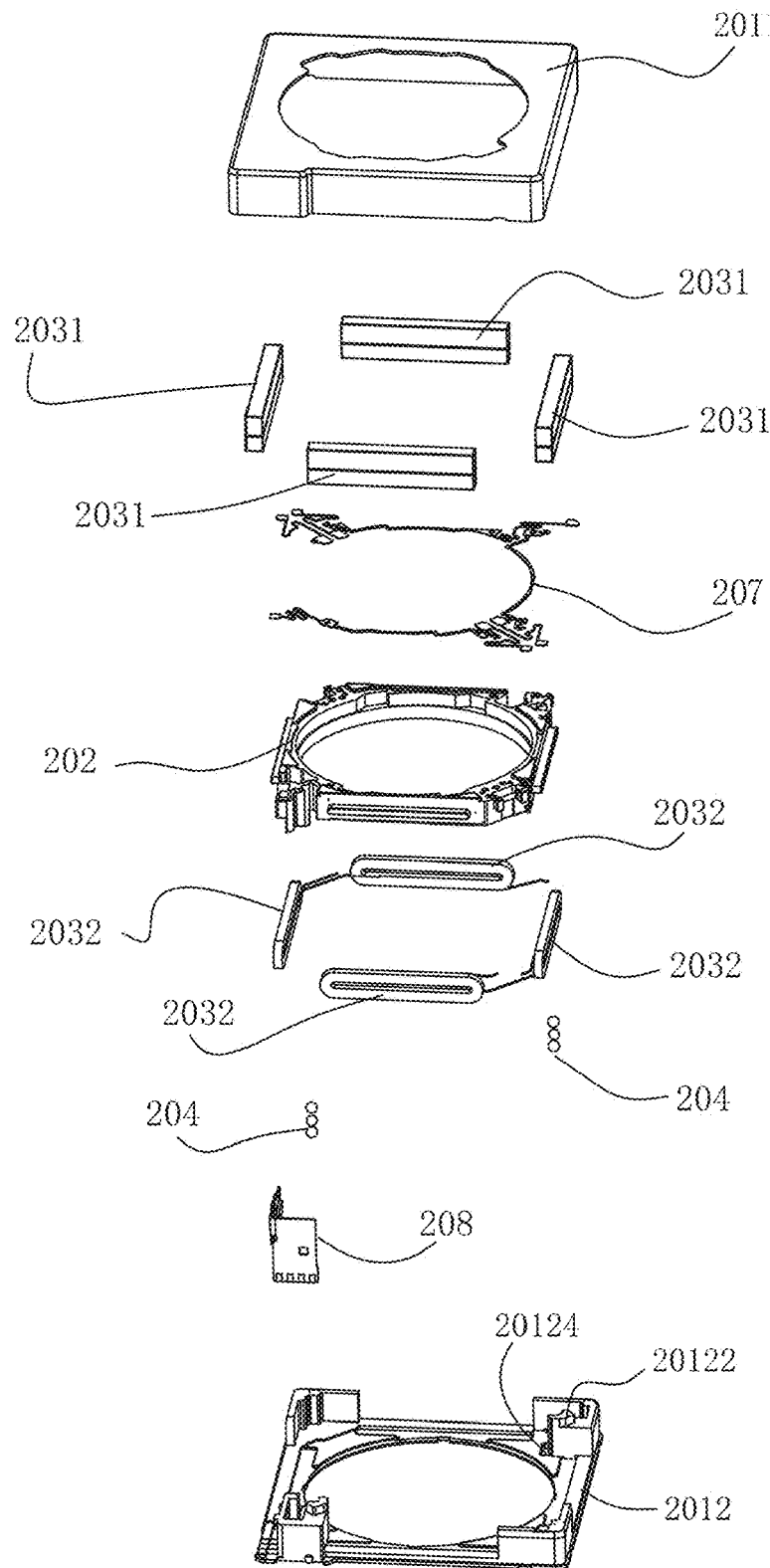
FIG. 19 shows an exploded view of the focusing drive module of the camera device shown in FIG. 17.

As an example, as shown in FIG. 16, the elastic connection portion 3066 may include two sets of first elastic edges 30661 and two sets of second elastic edges 30662. The two sets of first elastic edges 30661 are arranged correspondingly, and each set of the first elastic edges 30661 is connected to the first circuit board body 3062 through a first connecting arm 3067. The two sets of second elastic edges 30662 are arranged correspondingly, and each set of second elastic edges 30662 is connected to the circuit board fixing portion 3063 through a second connecting arm 3068, such that the first circuit board body 3062 can be moved in the plane perpendicular to the direction of the optical axis with respect to the circuit board fixing portion 3063, thereby driving the image sensor 303 to move.

In some embodiments, each set of first elastic edges 30661 may include a plurality of first elastic edges 30661 provided in parallel, and each set of second elastic edges 30662 may include a plurality of second elastic edges 30662 provided in parallel, so as to ensure the strength and the restoring force of the elastic connection portion 3066. For example, as shown in FIG. 16, each set of first elastic edges 30661 may include two first elastic edges 30661 provided in parallel, and each set of second elastic edges 30662 may include two second elastic edges 30662 provided in parallel.

Figure 15:
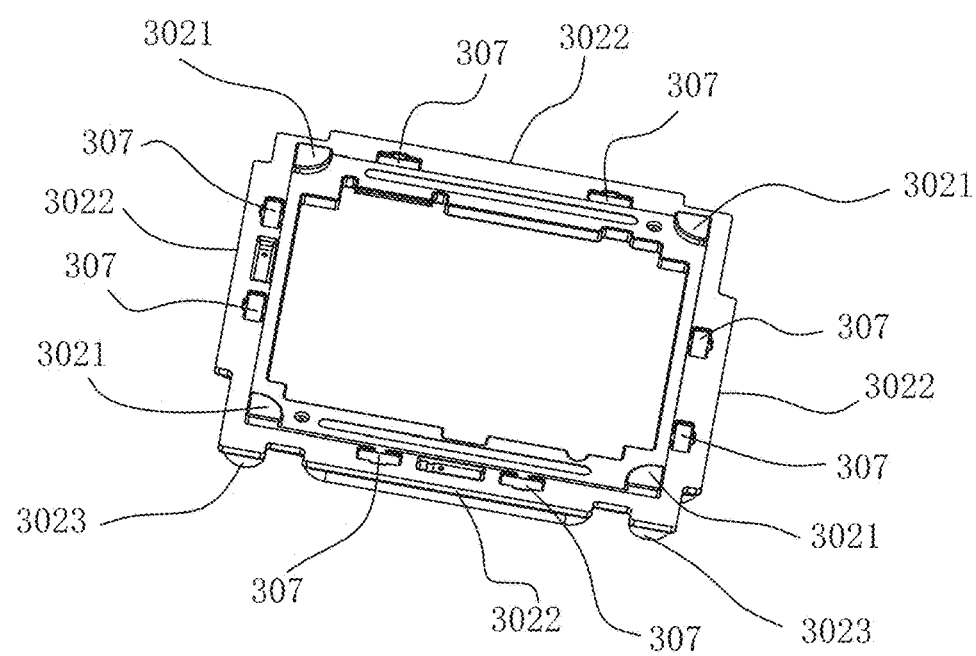
FIG. 15 shows a schematic assembly diagram of the bracket and the anti-shake magnetic yoke in the camera device shown in FIG. 1.

In some embodiments, as shown in FIGS. 12 and 13, the first circuit board 306 is further provided with a plurality of avoiding spaces 3065. All of the avoiding spaces 3065 are arranged symmetrically, and each of the avoiding spaces 3065 is formed between the first circuit board body 3062 and the circuit board fixing portion 3063. Accordingly, as shown in FIG. 15, the bracket 302 is provided with anti-collision tabs 3021, which are formed on a side of the bracket 302 facing the first circuit board 306 and arranged one-to-one with the avoiding spaces 3065. Each anti-collision tab 3021 is arranged through the corresponding avoiding space 3065, thereby preventing the first circuit board 306 and the image sensor 303 from colliding with the second casing 301 along the direction of the optical axis, and effectively protecting the first circuit board 306 and the image sensor 303.

In some embodiments, as shown in FIG. 15, in order to further protect the first circuit board 306 and the image sensor 303, the bracket 302 is further provided with a collision surface 3022 parallel to the direction of the optical axis, and the collision surface 3022 avoids the first circuit board 306 and the image sensor 303 from colliding with the second casing 301 along the direction perpendicular to the direction of the optical axis, thereby effectively protecting the first circuit board 306 and the image sensor 306 and the image sensor 303.

In this embodiment, as shown in FIG. 15, the bracket 302 is provided with the anti-collision tabs 3021 and the anti-collision surface 3022, which can protect the first circuit board 306 and the image sensor 303 in an all-round way, thereby avoiding the first circuit board 306 and the image sensor 303 from colliding with the second casing 301, and effectively improving the service life of the camera device 10.

Figure 3:
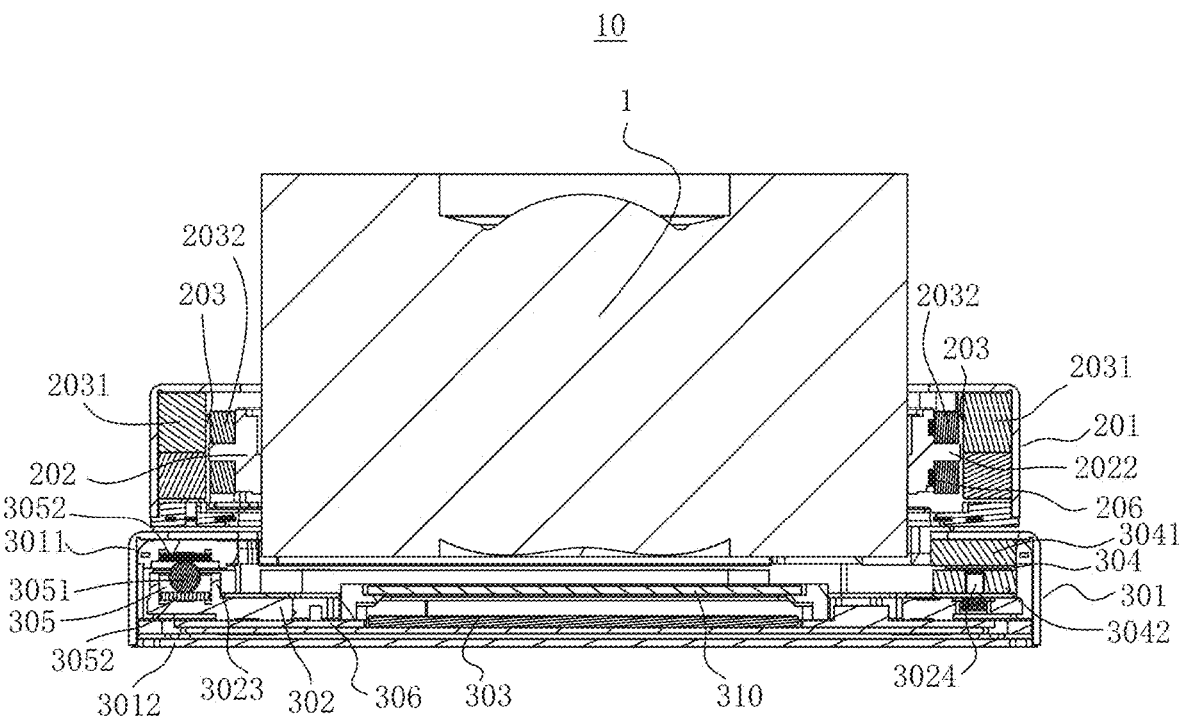
FIG. 3 shows a schematic cross-sectional view along line A-A of FIG. 2.

In some embodiments, there are a plurality of anti-shake guide assemblies 305. Each anti-shake guide assembly 305 is confined between the second casing 301 and the bracket 302, and each anti-shake guide assembly 305 includes a first ball 3051 and two support pieces 3052, as shown in FIG. 3. The two support pieces 3052 are abutted against opposite ends of the first ball 3051 along the direction of the optical axis, respectively. One of the support pieces 3052 is also abutted against the second casing 301, and the other of the support pieces 3052 is also abutted against the bracket 302, thereby effectively protecting the second casing 301 and the bracket 302 from wear and tear after a long period of time, and effectively improving the service life of the camera device 10.

Figure 14:
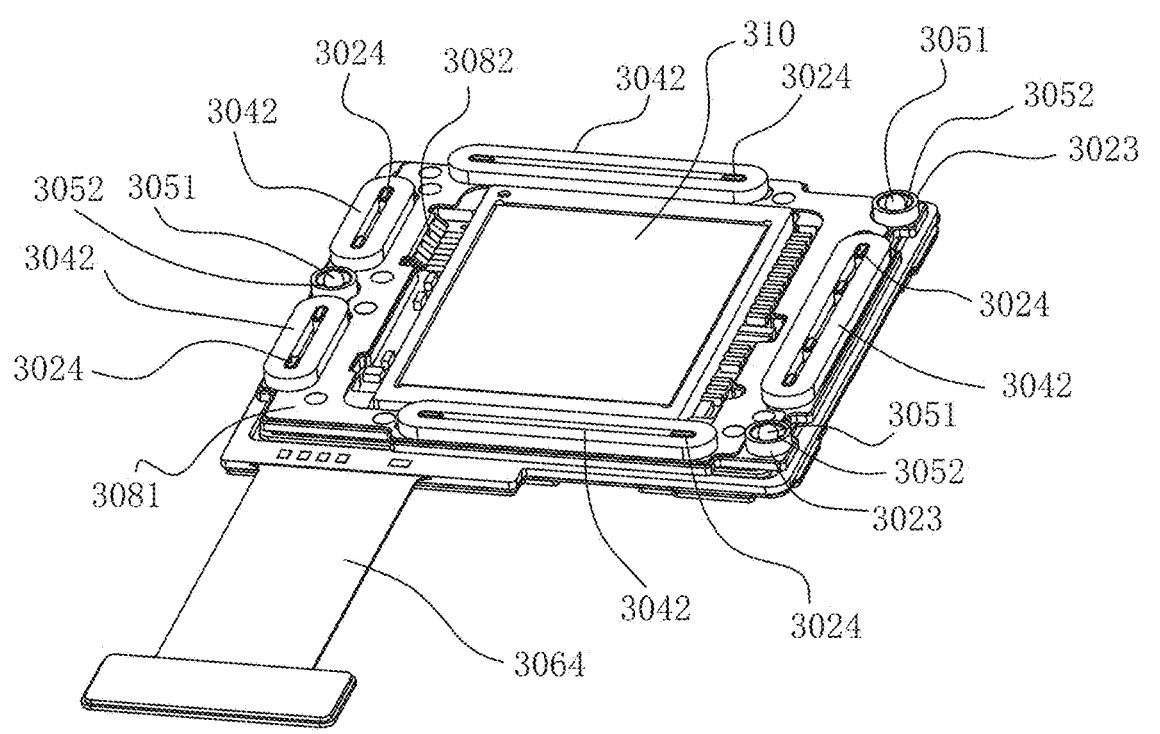
FIG. 14 shows a structural schematic diagram of the anti-shake drive module in the camera device shown in FIG. 1 with the second casing and the anti-shake magnetic steel removed.

In some embodiments, the bracket 302 is formed with a first limit cylinder 3023, as shown in FIGS. 3 and 14. One of the support pieces 3052 is provided in the first limit cylinder 3023, and the first ball 3051 is also accommodated in the first limit cylinder 3023, thereby effectively limiting the support piece 3052 and the first ball 3051. Accordingly, the second casing 301 is formed with a second limit cylinder 30111, and the other of support pieces 3052 is provided in the second limit cylinder 30111, thereby effectively limiting the support piece 3052, ensuring the stability of the structure of the anti-shake drive module 3, and avoiding random movement of the support piece 3052 and the first ball 3051.

In some embodiments, the support piece 3052 may be made of ceramic material. The first ball 3051 may also be made of ceramic material. It should be understood that in other embodiments, the support pieces 3052 and/or the first ball 3051 may also be made of other materials.

In some embodiments, there are a plurality of anti-shake drive assemblies 304. Each anti-shake drive assembly 304 is connected to the second casing 301 and the bracket 302, and each anti-shake drive assembly 304 includes an anti-shake magnetic steel 3041 and an anti-shake coil 3042 that are arranged correspondingly, as shown in FIG. 3. The anti-shake magnetic steel 3041 is fixed to the second casing 301. The anti-shake coil 3042 is fixed to the bracket 302, and the anti-shake coil 3042 is electrically connected to the first circuit board 306. The anti-shake drive module 3 further includes an anti-shake magnetic yoke 307, which is arranged correspondingly with the anti-shake drive assembly 304. The anti-shake magnetic yoke 307 is fixed to the bracket 302, and the anti-shake magnetic yoke 307 and the anti-shake magnetic steel 3041 are magnetically adsorbed, so that the anti-shake guide assembly 305 is abutted between the bracket 302 and the second casing 301, and ensures that the bracket 302 and the second casing 301 can be matched with each other to press the anti-shake guide assembly 305. The anti-shake magnetic yoke 307 may also provide a restoring force, to allow the bracket 302 to have a reset function.

In some embodiments, a first limit portion 3024 is formed on the bracket 302, as shown in FIG. 14. The first limit portion 3024 is arranged in one-to-one correspondence with the anti-shake coil 3042. During assembly, the anti-shake coil 3042 can be sleeved in the first limit portion 3024, so as to quickly and accurately locate the anti-shake coil 3042 onto the bracket 302.

As an example, each first limit portion 3024 may include a plurality of limit posts that are spaced apart, as shown in FIG. 14. The anti-shake coil 3042 is sleeved in all of the limit posts, thereby positioning the anti-shake coil 3042 onto the bracket 302.

It should be understood that in other embodiments, the first limit portion 3024 may also be made of other structures.

In some embodiments, the anti-shake coil 3042 and the anti-shake magnetic yoke 307 may be provided at opposite ends of the bracket 302 along the direction of the optical axis, respectively, as shown in FIGS. 14 and 15, which not only ensures an effective fit of the anti-shake coil 3042 and the anti-shake magnetic yoke 307 with the anti-shake magnetic steel 3041, but also prevents the detachment of the anti-shake magnetic yoke 307 from the bracket 302 caused by the magnetic attraction between the anti-shake magnetic yoke 307 and the anti-shake magnetic yoke 3041.

In some embodiments, as shown in FIG. 15, a third mounting hole 3025 may be provided on a side of the bracket 302 back away from the anti-shake coil 3042. The third mounting hole 3025 may be configured to mount the anti-shake magnetic yoke 307 so as to quickly and efficiently locate and limit the anti-shake magnetic yoke 307 to the bracket 302.

In some embodiments, the anti-shake drive module 3 further includes a second circuit board 308, as shown in FIG. 14. The second circuit board 308 is fixed between the anti-shake coil 3042 and the bracket 302. The anti-shake coil 3042 is electrically connected to the first circuit board 306 through the second circuit board 308. By electrically connecting the anti-shake coil 3042 and the first circuit board 306 located on the opposite side of the bracket 302 through the second circuit board 308, it makes wiring easier and makes the electrical connection relationship more stable.

In some embodiments, the second circuit board 308 may include a second circuit board body 3081 and a second electrical connection portion 3082, as shown in FIG. 14. The second circuit board body 3081 is in the shape of a frame. The second electrical connection portion 3082 extends from the second circuit board body 3081 toward the first circuit board 306. The second electrical connection portion 3082 can be configured to electrically connect to the first circuit board body 3062, which not only has a simple structure and facilitates the connection, but also ensures the stability of the electrical connection relationship between the second circuit board 308 and the first circuit board 306.

In some embodiments, the second circuit board body 3081 is in a planar shape, which can effectively reduce the thickness of the anti-shake drive module 3 and the camera device 10, thereby effectively reducing the size of the camera device 10.

In some embodiments, the second circuit board 308 may be a Flexible Printed Circuit (FPC), which is more convenient for assembly.

In some embodiments, the anti-shake drive module 3 further includes an anti-shake drive chip. The anti-shake drive chip can control the current of the anti-shake coil 3042. As an example, the anti-shake drive chip may be fixed to and electrically connected to the second circuit board 308.

In this embodiment, the anti-shake magnetic steel 3041 is fixed to the second casing 301. The anti-shake coil 3042, the anti-shake magnetic yoke 307, and the anti-shake drive chip are all fixed to the bracket 302. That is, the anti-shake coil 3042, the anti-shake magnetic yoke 307, the anti-shake drive chip, and the bracket 302 may move together.

It should be understood that in other embodiments, the anti-shake drive chip may also be fixed to and electrically connected to the first circuit board 306.

In some examples, the model number of the anti-shake drive chip may be AK7323.

Figure 10:
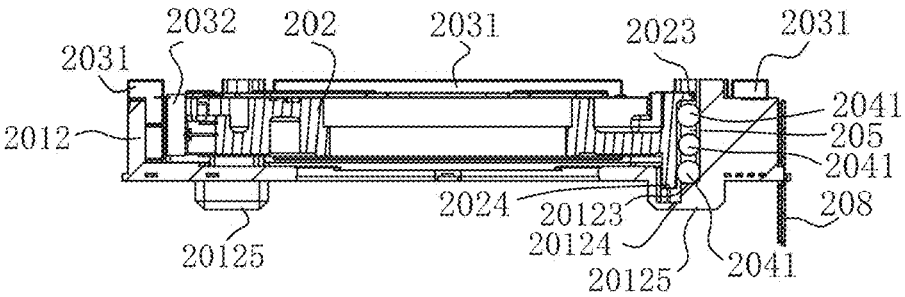
FIG. 10 shows a schematic cross-sectional view along line B-B of FIG. 9.
Figure 11:
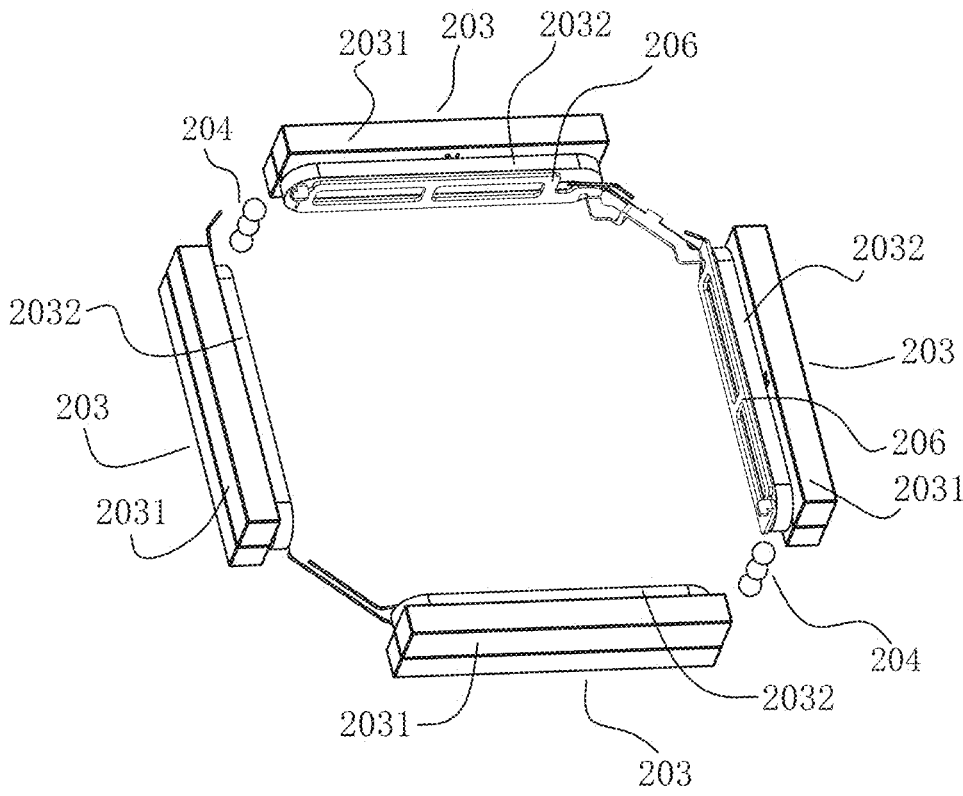
FIG. 11 is a schematic diagram showing the positional relationship among a focusing drive assembly, a focusing guide assembly, and a focusing magnetic yoke in the camera device shown in FIG. 1.

In some embodiments, there are a plurality of focusing guide assemblies 204. As shown in FIG. 10, each focusing guide assembly 204 is confined between the first casing 201 and the lens barrel 202, and includes a plurality of second balls 2041 arranged sequentially along the direction of the optical axis. Each second ball 2041 is confined between the first casing 201 and the lens barrel 202, and may roll in the direction of the optical axis.

In some embodiments, the second ball 2041 may be made of ceramic material. In other embodiments, the second ball 2041 may also be made of other materials.

As an example, all of the second balls 2041 may have equal diameters. Alternatively, the diameters of the second balls 2041 may not be equal. For example, as shown in FIG. 10, each focusing guide assembly 204 includes three second balls 2041. Two second balls 2041 on both sides have equal diameters, and the diameter of the second ball 2041 in the middle is smaller than the diameters of the two second balls 2041 on both sides, which not only prevents the second ball 2041 in the middle from interfering with the two second balls 2041 on both sides, but also makes the overall structure more stable.

In this embodiment, the first casing 201 is provided with a first limit groove 221, which extends in the direction of the optical axis. The lens barrel 202 is provided with a second limit groove 2021, which extends in the direction of the optical axis. The first limit groove 20121, the second limit groove 2021, and the focusing guide assembly 204 are provided in one-to-one correspondence. The correspondingly provided first limit groove 20121 and second limit groove 2021 are connected together to form a limit channel 205, and the limit channel 205 extends in the direction of the optical axis. The focusing guide assembly 204 is limited between the corresponding first limit groove 20121 and the second limit groove 2021. That is to say, the focusing guide assembly 204 is limited within the corresponding limit channel 205, as shown in FIG. 10, so as to ensure that the focusing guide assembly 204 can guide the lens barrel 202 to move along the direction of the optical axis of the lens module 1.

In some embodiments, there are a plurality of focusing drive assemblies 203. Each focusing drive assembly 203 is connected to the first casing 201 and the lens barrel 202.

In some embodiments, the focusing drive module 2 further includes a focusing magnetic yoke 206 arranged correspondingly with the focusing drive assembly 203. The focusing magnetic yoke 206 is fixed to the lens barrel 202, and the focusing magnetic yoke 206 and the focusing magnetic steel 2031 are magnetically adsorbed, so that the focusing guide assembly 204 is abutted between the lens barrel 202 and the first casing 201, ensuring that the lens barrel 202 and the first casing 201 can cooperate with each other to compress the focusing guide assembly 204. Besides, the focusing magnetic yoke 206 can also provide a restoring force, enabling the lens barrel 202 to have a reset function.

In this embodiment, a second limit portion 2022 is formed on an outer side of the lens barrel 202, as shown in FIG. 3. The second limit portion 2022 is provided in one-to-one correspondence with the focusing coil 2032. During assembly, the focusing coil 2032 can be sleeved in the second limit portion 2022 so as to quickly and accurately position the focusing coil 2032 onto the lens barrel 202.

As an example, the second limit portion 2022 may be in a strip-like structure as shown in FIG. 6, or the second limit portion 2022 may be in other structures.

In some embodiments, the focusing magnetic yoke 206 may be embedded in the lens barrel 202, which not only effectively reduces the size of the focusing drive module 2 and the camera device 10, but also enhances the strength of the lens barrel 202, and prevent the detachment of the focusing magnetic yoke 206 from the lens barrel 202 caused by the magnetic attraction between the focusing magnetic yoke 206 and the focusing magnetic steel 2031.

Figure 8:
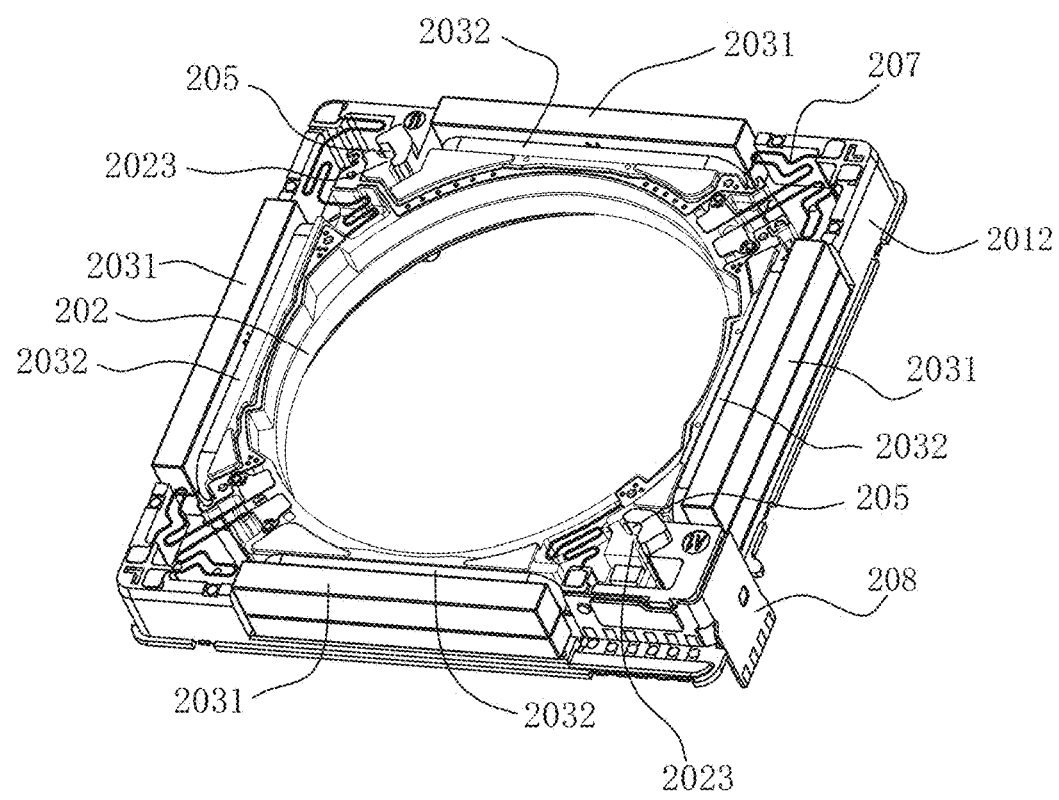
FIG. 8 shows a structural schematic diagram of the focusing drive module in the camera device shown in FIG. 1 with a first casing removed.
Figure 9:
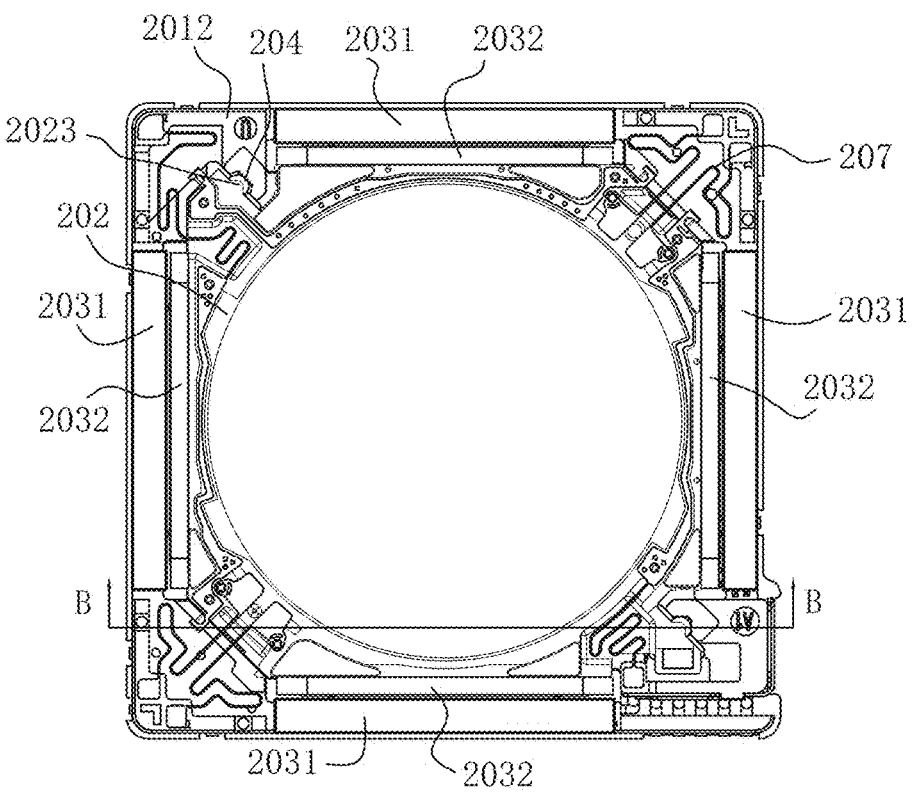
FIG. 9 shows a structural schematic diagram of the focusing drive module in the camera device shown in FIG. 1 with the first casing removed.

In some embodiments, the first casing 201 includes a first shell 2011 and a base 2012 inserted in the first shell 2011, and the focusing drive module 2 further includes an elastic member 207 and a third circuit board 208. As shown in FIGS. 8-9, the elastic member 207 is connected to the base 2012 and the lens barrel 202. The base 2012 is embedded with electrically conductive inserts. The electrically conductive insert not only plays the role of electrical connection, which can make the overall structure more compact, but also improve the strength of the base 2012, thereby effectively improving the service life of the camera device 10. The focusing coil 2032 is electrically connected to the third circuit board 208 through the elastic member 207 and the conductive insert in turn, and the third circuit board 208 can be fixed to the base 2012. The elastic member 207 not only enables the lens barrel 202 to move more stably along the direction of the optical axis, but also facilitates the reset of the lens barrel 202. Besides, the elastic member 207 can play a role in electrically connecting the conductive insert and the focusing coil 2032, making the overall structure more compact.

In some embodiments, as shown in FIG. 8, the base 2012 is provided with first support columns 20122 extending toward the inside of the first shell 2011, and the focusing magnetic steel 2031 may be arranged between two adjacent first support columns 20122, so as to effectively limit the focusing magnetic steel 2031 by the first support columns 20122, avoiding the focusing magnetic steel 2031 from moving relative to the first casing 201.

In some embodiments, the third circuit board 208 may be a Flexible Printed Circuit (FPC), which is easier to assemble.

In this embodiment, the first limit groove 20121 is provided in the base 2012. As an example, the first limit groove 20121 may be arranged in the first support column 20122. A side of the first limit groove 20121 close to the anti-shake drive module 3 is formed with a first limit rib 20123, and a side of the second limit groove 2021 away from the anti-shake drive module 3 is formed with a second limit rib 2023. The first limit rib 20123 and the second limit rib 2023 cooperate with each other to collectively confine the focusing guide assembly 204 within the limit channel 205.

Figure 7:
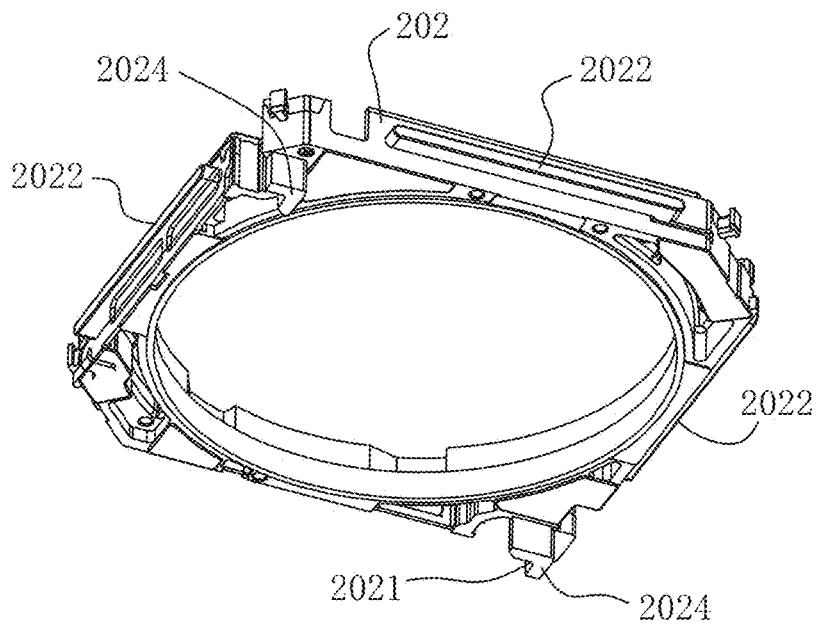
FIG. 7 shows a structural schematic diagram of a lens barrel in the camera device shown in FIG. 1.

In some embodiments, as shown in FIG. 7, a side of the lens barrel 202 close to the anti-shake drive module 3 is formed with limit edges 2024, and the second limit groove 2021 extends from the lens barrel 202 to the limit edge 2024. The base 2012 is provided with limit holes 2024 that corresponds to the limit edges 2024 one by one, and the first limit groove 20121 extends into the limit holes 2024. During assembly, each of the limit edges 2024 can be inserted in the corresponding limit holes 20124, which can quickly and accurately realize the positioning of the lens barrel 202 and the base 2012.

In some embodiments, the focusing drive module 2 further includes a focusing drive chip and a focusing chip magnetic steel. The focusing drive chip and the focusing chip magnetic steel cooperate with each other to detect the position of the lens barrel 202. The focusing drive chip may be fixed to the third circuit board 208 and electrically connected to the third circuit board 208. The focusing chip magnetic steel is fixed to the lens barrel 202 and is arranged opposite to the focusing drive chip. The focusing drive chip may control a current of the focusing coil 2032 while obtaining a change in the position of the focusing chip magnetic steel.

In some embodiments, the model number of the focusing drive chip may be AK7316.

In this embodiment, the focusing magnetic steel 2031 is fixed to the first casing 201, and the focusing coil 2032, the focusing magnetic yoke 206, and the focusing chip magnetic steel are all fixed to the lens barrel 202. That is, the focusing coil 2032, the focusing magnetic yoke 206, the focusing chip magnetic steel, and the lens barrel 202 can move together.

In some embodiments, as shown in FIGS. 12-13, the second casing 301 includes a second shell 3011 and a base 3012. The base 3012 is covered on a side of the second shell 3011 away from the focusing drive module 2, and the edge of the base 3012 is formed with a convex portion 30121 extending outwardly from the base 3012. The edge of the second shell 3011 is formed with a concave portion 30112. The concave portion 30112 can be configured to accommodate the convex portion 30121. The convex portion 30121 and the concave portion 30112 are fixed together by laser welding, which is not only securely fixed, but also convenient for production. The gap between the second shell 3011 and the base 3012 is glued and sealed, thereby effectively securing the second shell 3011 and the base 3012, and protecting the parts within the second shell 3011.

In some embodiments, the anti-shake drive module 3 may further include a gasket 309, refer to FIGS. 12-13. The gasket 309 is padded between the first circuit board 306 and the base 3012, which can effectively protect the image sensor 303 and the first circuit board 306. Further, the gasket 309 may be abutted between the circuit board fixing portion 3063 and the base 3012.

Figure 4:
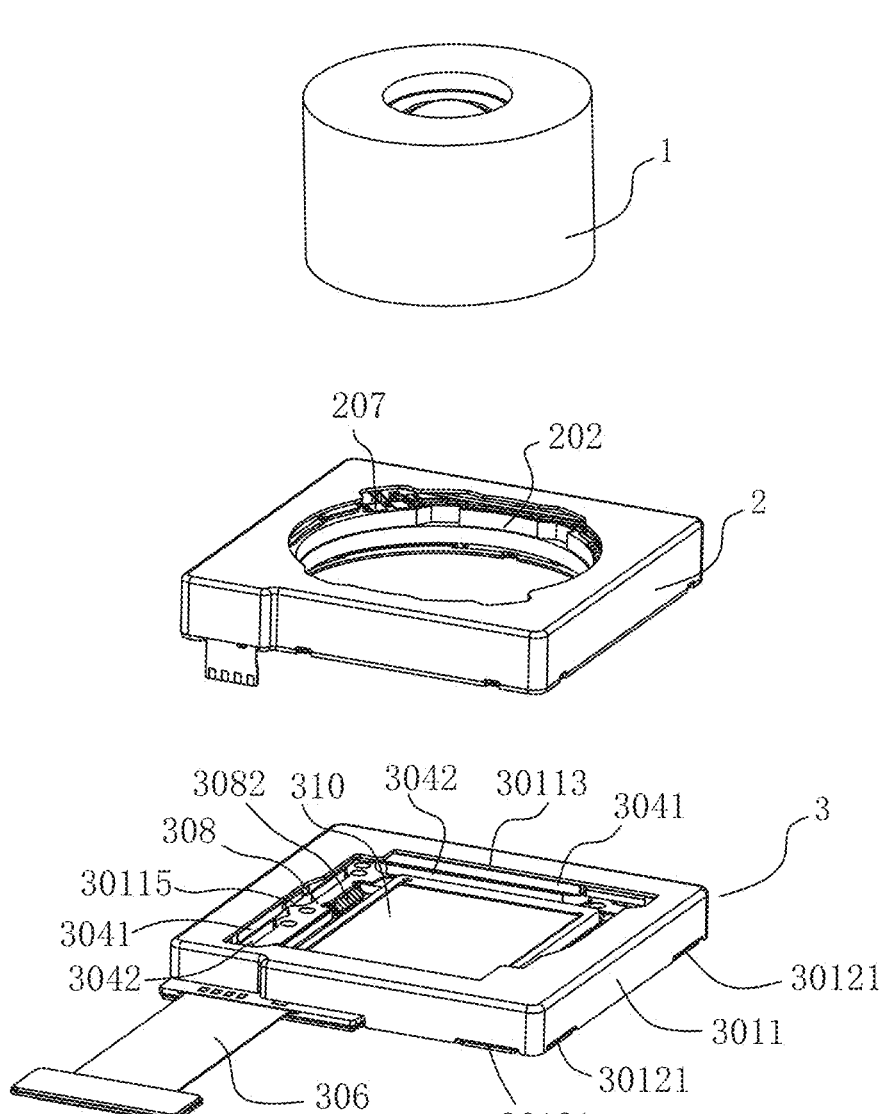
FIG. 4 shows an exploded view of the camera device shown in FIG. 1.
Figure 5:
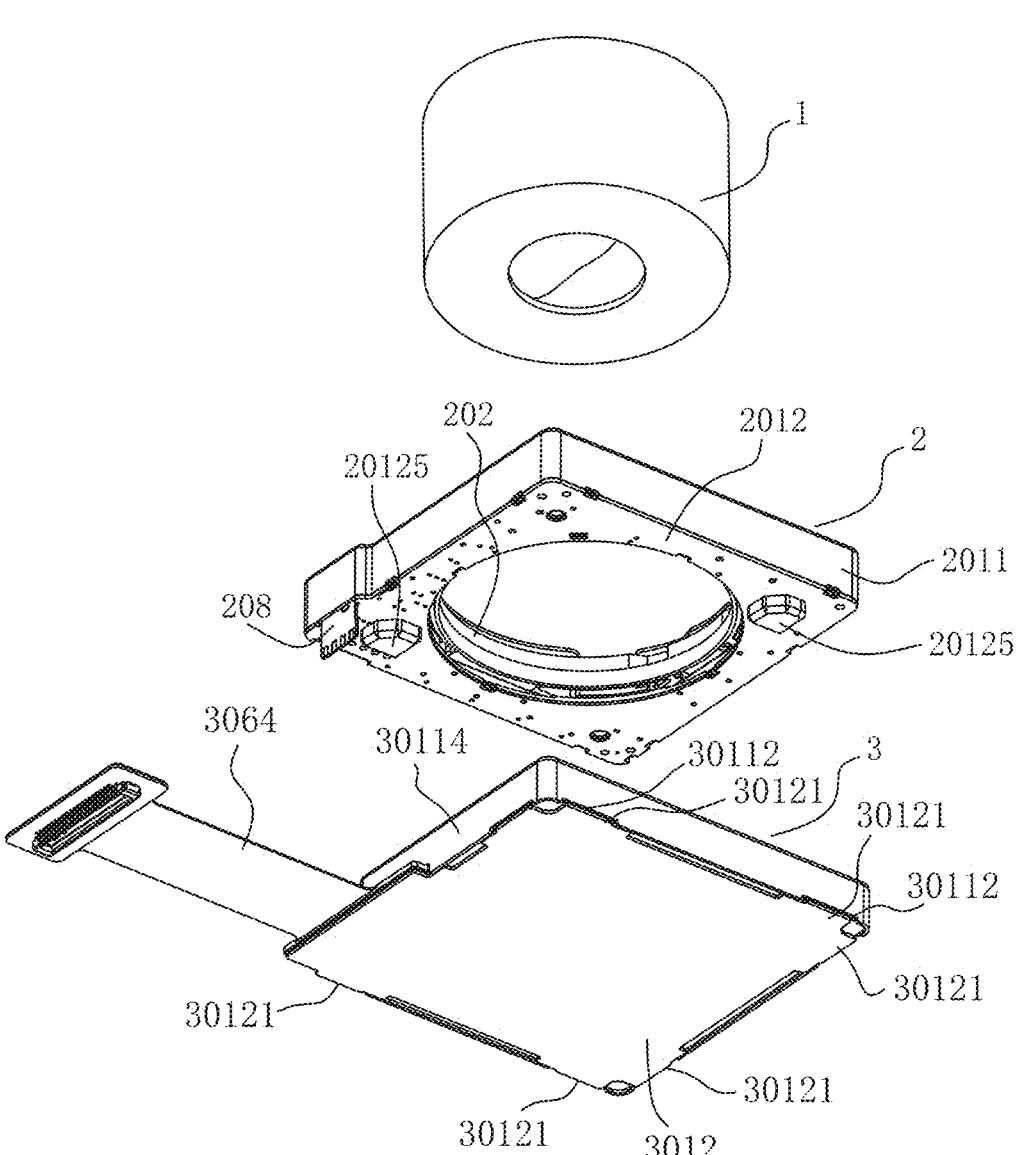
FIG. 5 shows an exploded view of the camera device shown in FIG. 1.

In some embodiments, a second mounting hole 30113 is provided in the second casing 301, as shown in FIG. 4. The second mounting hole 30113 cooperates with the lens module 1. A lower end of the first casing 201 is formed with a limiting tab 20125 inserted in the second mounting hole 30113, so that the focusing drive module 2 can be quickly and effectively positioned on the anti-shake drive module 3.

In this embodiment, the second mounting holes 30113 are opened in the second shell 3011. The limit tabs 20125 are formed in the base 2012.

In some embodiments, as shown in FIG. 10, the limit hole 20124 may extend to the limit tab 20125, which may effectively reduce the thickness of the base 2012, making the focusing drive module 2 more compact in structure, and thus effectively reducing the size of the camera device 10.

Figure 20:
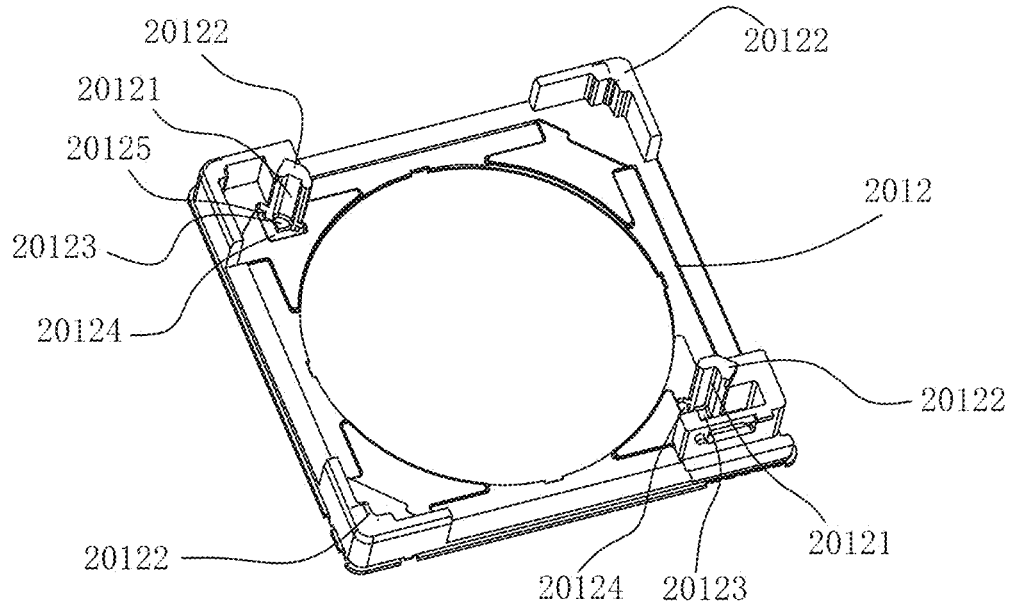
FIG. 20 shows a structural schematic diagram of a base in the camera device shown in FIG. 17.

It should be understood that in some embodiments, the limit hole 20124 may be a blind hole, as shown in FIG. 10. In other embodiments, the limit hole 20124 may also be a through hole, as shown in FIG. 20. The specific structure of the limit hole 20124 is not limited in the present application.

In some embodiments, the second shell 3011 may include a casing portion 30114 and a support seat 30115. The support seat 30115 is abutted within the casing portion 30114, and the support seat 30115 is provided with a second support post 30116 that extends toward the base 3012, as shown in FIG. 12 and FIG. 13. The second support post 30116 may be abutted against the circuit board fixing portion 3063, thereby quickly and efficiently realizing the positioning of the second shell 3011 with the first circuit board 306, and making the structure of the anti-shake drive module 3 more stable.

In this embodiment, the second limit cylinder 30111 is formed on the support base 30115.

In some embodiments, as shown in FIGS. 12 and 13, the anti-shake drive module 3 further includes an optical filter 310. The optical filter 310 is covered on the image sensor 303, and the optical filter 310 is fixed to the first circuit board body 3062.

Embodiments of the present application further provide an electronic device including a device body and any one of the above-mentioned camera devices 10. The camera device 10 is provided on the device body.

Described above are only some embodiments of the present application. It should be pointed out that for the ordinary skilled person in the field, under the premise of not departing from the creative concept of the present application, improvements may also be made, but these are within the scope of protection of the present application.

What is claimed is:

1. A camera device, comprising:
   a lens module;
   a focusing drive module comprising:
   a first casing;
   a lens barrel accommodated in the first casing and fixed with the lens module;
   a focusing drive assembly; the focusing drive assembly being connected to the first casing and the lens barrel for driving the lens barrel to move with respect to the first casing, and comprising a focusing magnetic steel and a focusing coil that are arranged correspondingly, wherein the focusing magnetic steel is fixed to the first casing, and the focusing coil is fixed to the lens barrel; and
   a focusing guide assembly confined between the first casing and the lens barrel for guiding the lens barrel in a direction of an optical axis of the lens module; and
   an anti-shake drive module comprising:
   a second casing;
   an image sensor;
   a bracket accommodated in the second casing and fixed with the image sensor;
   an anti-shake drive assembly connected to the second casing and the bracket for driving the bracket to move with respect to the second casing; and
   an anti-shake guide assembly confined between the second casing and the bracket for guiding the bracket in a direction perpendicular to the optical axis of the lens module;
   wherein the lens module, the focusing drive module, and the anti-shake drive module are sequentially fixed into one unit;

wherein the anti-shake drive module comprises a planar first circuit board partially accommodated in the second casing; the first circuit board is fixed to a side of the bracket away from the lens module, and a first mounting hole is provided in a middle of the first circuit board; the image sensor is fixed in the first mounting hole, and the image sensor and the anti-shake drive assembly are electrically connected to the first circuit board;

wherein there are a plurality of the anti-shake guide assemblies, and each of the anti-shake guide assemblies is confined between the second casing and the bracket, and comprises a first ball and two support pieces; wherein the two support pieces are abutted against opposite ends of the first ball along the direction of the optical axis, respectively; one of the support pieces is also abutted against the second casing, and the other of the support pieces is also abutted against the bracket;

wherein there are a plurality of the anti-shake drive assemblies, and each of the anti-shake drive assemblies is connected to the second casing and bracket, and comprises an anti-shake magnetic steel and an anti-shake coil that are arranged correspondingly; wherein the anti-shake magnetic steel is fixed to the second casing, and the anti-shake coil is fixed to the bracket and electrically connected to the first circuit board; the anti-shake drive module further comprises anti-shake magnetic yokes arranged in correspondence with the anti-shake drive assemblies, wherein the anti-shake magnetic yokes are fixed to the bracket.

2. The camera device of claim 1, wherein the first circuit board comprises a first circuit board body provided with the first mounting hole, a circuit board fixing portion elastically connected to an outside of the first circuit board body, and a first electrical connection portion fixed to the circuit board fixing portion; the first circuit board body and the circuit board fixing portion are accommodated in the second casing, and the first circuit board body is fixed to the bracket; the circuit board fixing portion is fixed to the second casing, and the first electrical connection portion is extended out of the second casing; the first circuit board further comprises a plurality of avoiding spaces that are symmetrically arranged, wherein the avoiding spaces are formed between the first circuit board body and the circuit board fixing portion; a side of the bracket facing the first circuit board is provided with anti-collision tabs arranged one-to-one with the avoiding spaces; each of the anti-collision tabs is arranged through one of the avoiding spaces correspondingly, and the bracket further comprises an anti-collision surface parallel to the direction of the optical axis.

3. The camera device of claim 1, wherein the anti-shake drive module further comprises a second circuit board; the second circuit board is fixed between the anti-shake coil and the bracket, and the anti-shake coil is electrically connected to the first circuit board through the second circuit board.

4. The camera device of claim 1, wherein there are a plurality of the focusing guide assemblies; each of the focusing guide assemblies is confined between the first casing and the lens barrel, and comprises a plurality of second balls arranged sequentially along the direction of the optical axis.

5. The camera device of claim 4, wherein there are three second balls, and a diameter of the second ball located in the middle is smaller than diameters of two second balls located on both sides.

6. The camera device of claim 1, wherein there are a plurality of the focusing drive assemblies; each of the focusing drive assemblies is connected to the first casing and lens barrel respectively; the focusing drive module further comprises a focusing magnetic yoke arranged in correspondence with the focusing drive assemblies, wherein the focusing magnetic yoke is fixed to the lens barrel.

7. The camera device of claim 6, wherein the first casing comprises a first shell and a base inserted within the first shell, and the focusing drive module further comprises an elastic member and a third circuit board; the elastic member is connected to the base and lens barrel; a conductive insert is embedded in the base, and the focusing coil is electrically connected to the third circuit board through the elastic member and the conductive insert in turn.

8. The camera device of claim 1, wherein the second casing comprises a second shell and a base covered on a side of the second shell away from the focusing drive module; a convex portion is formed by extending outwardly from an edge of the base, and an edge of the second shell is formed with a concave portion for accommodating the convex portion; the convex portion and the concave portion are fixed together by laser welding, and a gap between the second shell and the base is glued and sealed.

9. The camera device of claim 1, wherein the second casing is provided with a second mounting hole for cooperating with the lens module, and a lower end of the first casing is formed with a limiting tab inserted in the second mounting hole.

10. The camera device of claim 1, wherein the anti-shake guide assembly is further configured to guide the bracket to rotate on an axis of the optical axis in a plane perpendicular to the optical axis.

11. An electronic device, comprising an device body and a camera device of claim 1, wherein the camera device is provided on the device body.

* * * * *